United States Patent [19]

Miller et al.

[11] 4,431,527

[45] Feb. 14, 1984

[54] PROCESS FOR HYDROGEN TREATING HIGH NITROGEN CONTENT HYDROCARBON FEEDS

[75] Inventors: Jeffrey T. Miller, Naperville, Ill.; Albert L. Hensley, Jr., Munster, Ind.

[73] Assignee: Standard Oil Company (Indiana), Chicago, Ill.

[21] Appl. No.: 320,863

[22] Filed: Nov. 13, 1981

[51] Int. Cl.³ .................. C10G 45/08; C10G 45/12
[52] U.S. Cl. .................. 208/254 H; 208/111; 208/216 R
[58] Field of Search .................. 208/254 H, 111, 114

[56] References Cited

U.S. PATENT DOCUMENTS

| | | | |
|---|---|---|---|
| 3,169,106 | 2/1965 | Lefrancois et al. | 208/111 |
| 3,354,096 | 11/1967 | Young | 208/111 X |
| 3,493,517 | 2/1970 | Jaffe | 208/254 H |
| 3,507,778 | 4/1970 | Gladrow et al. | 208/111 |
| 3,755,150 | 8/1973 | Mickelson | 208/216 R |
| 3,761,397 | 9/1973 | Gatti | 208/143 |
| 3,778,365 | 12/1973 | Hamner et al. | 208/111 |
| 3,867,279 | 2/1975 | Young | 208/114 |
| 3,897,365 | 7/1975 | Feins et al. | 208/254 H |
| 4,326,947 | 4/1982 | Sawyer et al. | 208/111 |
| 4,327,236 | 4/1982 | Klotz | 585/481 |

*Primary Examiner*—Delbert E. Gantz
*Assistant Examiner*—O. Chaudhuri
*Attorney, Agent, or Firm*—James R. Henes; William T. McClain; William H. Magidson

[57] ABSTRACT

A process for denitrogenation of high nitrogen content hydrocarbon feeds comprising contacting the feed with hydrogen under denitrogenation conditions in the presence of a catalyst comprising an active metallic component comprising at least one metal having hydrogenation activity and at least one oxygenated phosphorus component and a support component comprising at least one non-zeolitic, porous refractory inorganic oxide matrix component and at least one crystalline molecular sieve zeolite component.

11 Claims, No Drawings

PROCESS FOR HYDROGEN TREATING HIGH NITROGEN CONTENT HYDROCARBON FEEDS

BACKGROUND OF THE INVENTION

This invention relates to a process for hydrogen treating hydrocarbon feeds containing high levels of nitrogen compounds.

Decreasing supplies of high quality petroleum crude oils have focused considerable attention on production and upgrading of lower quality petroleum crude oils as well as synthetic materials. Oil shale shows promise as an abundant as well as reliable source of hydrocarbons that can be converted to products of the type commonly obtained from petroleum hydrocarbons. Unfortunately, typical shale oils contain extremely high levels of nitrogen as well as significant amounts of oxygen as compared to typical petroleum crude oils. Accordingly, to facilitate conversion of shale oils and similar high nitrogen content feed materials to useful products or products suitable for use as feed materials in conventional petroleum refining operations, treatment is required to remove nitrogen.

Of course, nitrogen-containing petroleum crude oils also are known and a number of processes for removal of nitrogen from nitrogen-containing feeds obtained from both petroleum and synthetic crude oils have been proposed. Among these are various solvent denitrification processes which involve extraction of a feed with acids or polar solvents to remove nitrogen-containing molecules, as well as catalytic processes typically involving contacting a feed with hydrogen in the presence of hydrodenitrogenation catalysts whereby nitrogen and hydrogen react to form easily removable nitrogen compounds such as ammonia without substantial destruction or removal of hydrocarbon feed components with which the nitrogen was associated.

Typical catalysts employed in catalytic hydrodenitrogenation processes contain a hydrogenating metal component such as an oxide or sulfide of a Group VIB and/or VIII metal deposed on a refractory inorganic oxide support such as alumina. It also is known that the activity of such catalysts for hydrodenitrogenation reactions can be promoted by inclusion of a phosphorus component in the hydrogenating component as disclosed in U.S. Pat. No. 3,446,730 (Kerns et al.) and U.S. Pat. No. 3,749,664 (Mickelson). Use of catalysts such as those of Kerns et al. or Mickelson in hydrodenitrogenation of high nitrogen content feeds can result in reduction of product nitrogen levels to the point that it is possible to hydrocrack the product in the presence of conventional hydrocracking catalysts. Without a prior hydrodenitrogenation treatment, however, the high nitrogen content of the feed typically poisons conventional hydrocracking catalysts.

In copending, commonly assigned application Ser. No. 200,536 of Tait et al. filed Oct. 24, 1980, an improved catalyst and process for hydrogen processing hydrocarbon feeds, particularly those of high nitrogen content, are disclosed and claimed. The process of that application involves contacting feed with hydrogen in the presence of a catalyst of improved thermal stability comprising a hydrogenating component comprising a chromium component, a molybdenum component and at least one Group VIII metal component and a support component comprising a porous, refractory inorganic oxide component and a crystalline molecular sieve zeolite component. Commonly assigned, copending application Ser. No. 231,757 of Miller, filed Feb. 5, 1981, discloses and claims improved hydrotreating catalysts comprising a hydrogenating component comprising a chromium component, at least one other Group VIB metal component, at least one Group VIII metal component and a phosphorus component deposed on a porous refractory inorganic oxide support. Particularly good results are attained in denitrogenation of high nitrogen feeds.

In copending, commonly assigned application Ser. No. 320,866 filed concurrently herewith, Hensley et al. disclose and claim improved catalytic compositions having utility in a wide range of hydrocarbon conversion reactions comprising an active metallic component comprising at least one metal having hydrocarbon conversion activity and at least one oxygenated phosphorus component and a support component comprising at least one non-zeolitic, porous refractory inorganic oxide matrix component and at least one crystalline molecular sieve zeolite component.

We have now found that certain catalytic compositions according to the aforesaid Hensley et al. application give particularly good results in hydrogen processing of high nitrogen feeds. Accordingly, it is an object of this invention to provide an improved process for hydrogen treating of high nitrogen content hydrocarbon feeds. A further object is to provide a process for denitrogenation hydrotreating and/or hydrocracking of such feeds in the presence of the aforesaid catalysts. Other objects of the invention will be apparent to persons skilled in the art from the following description and the appended claims.

As compared to the phosphorus-promoted, zeolite-free catalysts of the aforesaid Kerns et al. and Mickelson patents, use of the catalysts of Hensley et al. according to this invention yields significantly improved results in terms of both hydrodenitrogenation and hydrocracking. As compared to the above-described hydrogen processing processes employing zeolite or phosphorus-containing catalysts in which the hydrogenating metals comprise chromium, molybdenum or tungsten, and at least one Group VIII metal components, the process of the present invention yields improved results in that improved hydrodenitrogenation and/or hydrocracking can be attained under conditions comparable to those employed according to the aforesaid processes while results comparable to those achieved according to such processes can be attained under less severe conditions according to the present invention.

DESCRIPTION OF THE INVENTION

Briefly the process of this invention comprises contacting a high nitrogen content hydrocarbon feed with hydrogen under denitrogenation hydrotreating or hydrocracking conditions in the presence of a catalyst comprising an active metallic component comprising at least one metal having hydrogenation activity and at least one oxygenated phosphorus component, and a support component comprising at least one non-zeolitic, porous refractory inorganic oxide matrix component and at least one crystalline molecular sieve zeolite component.

In greater detail, hydrocarbon feeds employed according to the present invention are those containing substantial levels of nitrogen compounds. Preferred feeds are those containing at least about 0.4 wt % nitrogen. Specific examples of preferred high nitrogen feeds include whole shale oils and fractions thereof such as shale oil resids, vacuum and atmospheric pheric distillates and naphtha fractions. Whole petroleum crude oils, tar sands oils, coal and biomass liquids suitably high in nitrogen, as well as various fractions thereof, also are particularly well suited for use according to this invention.

Denitrogenation conditions employed according to the present invention vary somewhat depending on the choice of feed as well as the type of processing to be conducted. Denitrogenation hydrotreating conditions are employed when it is desired to reduce nitrogen content of the feed without substantial cracking thereof and include a temperature of about 650° to about 760° F., hydrogen pressure of about 1000 to about 2500 psi, linear hourly space velocity (LHSV) of about 0.2 to about 4 volumes of feed per volume of catalyst per hour (hour$^{-1}$) and hydrogen addition rate of about 2000 to about 20,000 standard cubic feet per barrel (SCFB). Preferred denitrogenation hydrotreating conditions include a temperature ranging from about 680° to about 750° F., hydrogen pressure of about 1400 to about 2200 psi, LHSV of about 0.3 to about 3 and hydrogen rate of about 4000 to about 10,000 SCFB as these result in desirable reductions in product nitrogen while avoiding exposure of the catalyst to conditions so severe as to adversely affect catalyst lifetime.

Denitrogenation hydrocracking conditions are employed when it is desired to remove nitrogen from the feed as well as crack higher boiling components thereof to lower boiling components. Denitrogenation hydrocracking temperature ranges from about 720° to about 820° F., hydrogen pressure ranges from about 1000 to about 2500 psi, LHSV ranges from about 0.2 to about 3 and hydrogen addition rate ranges from about 4,000 to about 20,000 SCFB. A particularly preferred application in which denitrogenation hydrocracking conditions are employed is in conversion of whole shale oils or fractions thereof to jet fuel. Preferred conditions for such an application include a temperature ranging from about 750° to about 820° F., hydrogen pressure of about 1200 to about 2200 psi, LHSV of about 0.3 to about 1 and hydrogen addition rate of about 5000 to about 10,000 SCFB.

The process of this invention can be conducted in either fixed or expanded bed operations using a single reactor or series thereof as desired.

Catalysts according to the aforesaid Hensley et al. application that are employed according to the process of this invention exhibit high activity for both denitrogenation hydrotreating and denitrogenation hydrocracking. The catalysts also exhibit a high degree of thermal stability under process conditions. The catalysts comprise an active metallic component comprising at least one metal having hydrogenation activity and at least one oxygenated phosphorus component, and a support component comprising at least one non-zeolitic, porous refractory inorganic oxide matrix component and at least one crystalline molecular sieve zeolite component. Content of the metallic component and the support component are not critical so long as the catalyst contains at least a catalytically effective amount of the active metallic component. Preferably, about 10 to about 40 wt % of total catalyst weight is made up of active metallic component and 60 to about 90 wt % is made up of the support component.

Useful hydrogenating metals of the active metallic component of the catalyst employed according to the invented process are metals of Groups VIB and VIII, specific examples of which include chromium, molybdenum, tungsten, iron, cobalt, nickel, ruthenium, rhodium, palladium, osmium, iridium and platinum. Combinations of these also can be employed if desired and often give particularly good results. These metals can be present in the metallic component in the form of elements, as oxides or sulfides, or as combinations thereof. The oxides and sulfides are preferred in view of their greater activity for hydrogenation reactions in the presence of sulfur.

The active metallic component of the catalysts employed in the process of this invention also contains at least one oxygenated phosphorus component which may be present in a variety of forms such as one or more simple oxides, phosphate anions, complex species in which phosphorus is linked through oxygen to one or more metals of the metallic component or compounds of such metal or metals, or combinations thereof.

Content of the metal and phosphorus components of the active metallic component are not critical although is desirable to employ at least an amount of oxygenated phosphorus component that is effective to promote activity of the hydrogenation metal or metals. On the basis of total catalyst weight, and expressed as metal oxide, e.g. $Cr_2O_3$, $MoO_3$, $WO_3$, NiO, CoO, hydrogenating metal makes up about 10 to about 40 wt % of overall catalyst weight while phosphorus component, expressed as $P_2O_5$, makes up about 0.5 to about 15 wt % of overall catalyst weight.

The support component of the catalysts employed according to this invention comprises at least one non-zeolitic, porous refractory inorganic oxide matrix component and at least one crystalline molecular sieve zeolite component. Suitable non-zeolitic matrix components are well known to persons skilled in the art and include alumina, silica, zirconia, titania, magnesia, silica-alumina and various other combinations of refractory metal oxides. The matrix component also can include adjuvants such as one or more oxides of phosphorus or boron, or a halogen such as chlorine or fluorine.

The crystalline molecular sieve zeolite component of the catalyst is a zeolitic material derived from an acid-tolerant crystalline molecular sieve zeolite, i.e., one that retains substantial crystallinity on exposure to phosphoric acid at a pH down to about 3 to 4 and contains sufficiently low levels of metals capable of reacting with aqueous phosphoric acid to form insoluble metal phosphates as to avoid plugging of pores of the support component with such insoluble metal phosphates. Examples of such crystalline molecular sieve zeolites include acid-tolerant mordenite-type crystalline aluminosilicate zeolites, faujasite-type crystalline aluminosilicate zeolites selected from the ultrastable Y-type crystalline aluminosilicate zeolites and Y-type crystalline aluminosilicate zeolites in hydrogen or ammonium form; ZSM-type crystalline aluminosilicate zeolites and AMS-type crystalline borosilicate zeolites. Y-type zeolites in ammonium form are converted to acid form during catalyst preparation.

Concentrations of the matrix component and the zeolite component in the support component of the catalysts employed according to this invention are not critical although it is preferred to employ at least enough of the matrix component to give the support component sufficient strength and integrity that the ultimate catalyst composition can be employed in denitrogenation hydrotreating or hydrocracking according to this invention without appreciable damage to the catalyst. Usefully, matrix component content ranges from about 5 to about 95 wt % of the total support weight while zeolite content ranges from about 5 to about 95 wt % of total support component.

Preferably, the support component of the catalyst employed according to this invention is in the form of a dispersion of the zeolite component within the matrix component. Such dispersions can be prepared by well known techniques such as by blending the zeolitic component, preferably in finely divided form, into a sol, hydrosol or hydrogel of an inorganic oxide and then adding a gelling medium such as ammonium hydroxide and stirring to produce a gel. Alternately, the zeolite component is blended into a slurry of the matrix component. In either case, the result can be dried, shaped if desired, and then calcined to form the final support component. A less preferred, but still suitable, method for preparing a suitable dispersion of crystalline molecular sieve zeolite component in the matrix component is to dry-blend particles of each, preferably in finely divided form, and then conduct any desired shaping operations.

A preferred method for preparing the catalysts employed according to the present invention comprises impregnation of a support component comprising at least one non-zeolitic, porous refractory inorganic oxide matrix component and at least one acid-tolerant, crystalline molecular sieve zeolite component with precursors to the active metallic component comprising at least one metal having hydrogenating activity and at least one oxygenated phosphorus component under conditions effective to avoid substantial destruction of zeolite crystallinity, followed by calcination of the result to convert the precursors to the metallic component to active form. Alternately, the matrix component is impregnated with precursors to the active metallic component and the result is blended, before or after calcination, with the zeolitic component of the support component. In general, the mechanics and conditions of the preparation are in accordance with well known impregnation techniques except that when a phosphorus component precursor containing or capable of liberating phosphate anions, e.g., phosphoric acid or salts thereof, is used, care must be taken to insure that the impregnation is conducted at a pH of at least about 2 in order to avoid substantial destruction of zeolite crystallinity. More preferably, pH of such impregnating solutions ranges from about 2.5 to about 6 to insure substantial retention of crystallinity as well as the desired association of the phosphorus and metal components of the active metallic component. Of course, depending on the specific zeolite employed in preparation of a given catalyst, the optimum pH range will vary somewhat.

Further details with respect to the catalysts employed according to the process of the present invention are found in the aforesaid application Ser. No. 320,866 of Hensley et al. filed concurrently herewith, which application is incorporated herein by reference.

Catalysts according to Hensley et al. that are preferred for use in the denitrogenation hydrotreating or hydrocracking process of the present invention are those in which the hydrogenating metal of the active metallic component is nickel, cobalt, chromium, molybdenum, tungsten or a combination thereof, the non-zeolitic matrix component comprises alumina or silica-alumina and the crystalline molecular sieve zeolite component comprises an ultrastable Y-type crystalline aluminosilicate zeolite, a crystalline aluminosilicate zeolite of the ZSM-type or a crystalline borosilicate zeolite of the AMS-type, as these exhibit high activity for denitrogenation hydrotreating and hydrocracking. More preferably, the hydrogenation metals of the active metallic component comprise a combination of nickel and molybdenum or a combination of cobalt or nickel, chromium and molybdenum and are present in an amount ranging from about 10 to about 30 wt % calculated as metal oxide and based on total catalyst weight, and the support component contains about 40 to about 80 wt % alumina or silica-alumina having dispersed therein about 20 to about 60 wt % crystalline molecular sieve zeolite component, such weight percentages being based on support weight.

Most preferably, the catalyst employed according to the present invention contains about 1 to about 5 wt % NiO and about 12 to about 20 wt % $MoO_3$; or about 1 to about 5 wt % CoO or NiO, about 2 to about 10 wt % $Cr_2O_3$ and about 12 to about 20 wt % $MoO_3$; and about 0.5 to about 8 wt % oxygenated phosphorus component, expressed as $P_2O_5$; and a support containing a dispersion of about 30 to about 60 wt % ultrastable Y-type crystalline aluminosilicate zeolite, AMS-type crystalline borosilicate zeolite or ZSM-type crystalline aluminosilicate zeolite in about 40 to about 70 wt % alumina or silica-alumina. Ultrastable Y-type crystalline aluminosilicate zeolites give best results in denitrogenation hydrocracking applications.

The present invention is described in further detail in connection with the following example, it being understood that the same is for purposes of illustration and not limitation.

EXAMPLE

The catalysts prepared in Examples 1 and 2 of application Ser. No. 320,866 of Hensley et al. filed concurrently herewith were tested for denitrogenation hydrotreating and hydrocracking activity in an automated processing unit that included a vertical, tubular, downflow reactor having a length of 32" and inner diameter of ¼". The unit included automatic controls to regulate hydrogen pressure and flow, temperature and feed rate. Catalyst was ground to 14–20 mesh and loaded into a 10–12" segment of the reactor and sulfided wherein by passing 8 vol % $H_2S$ in hydrogen over the catalyst at 300 psi for 1 hour at 300° F., followed by 1 hour at 400° F. and then 1 hour at 700° F. The reactor then was heated to operating temperature, pressured with hydrogen and a high nitrogen feed generated in situ from oil shale was pumped into the reactor using a Ruska pump. The feed had the following properties:
API Gravity (°)—23.8
Nitrogen (wt %)—1.27
Sulfur (wt %)—0.65
Oxygen (wt %)—1.40
Pour Point (°F.)—60
Simulated Distillation (%).
    IBP—360° F.—2.0
    360—650° F.—42.5
    650° F.+—55.5.

Catalyst 1 of Hensley et al. contained 5.0 wt % $Cr_2O_3$, 15.0 wt % $MoO_3$, 1.5 wt % CoO and 5.5 wt % oxygenated phosphorus component, calculated as $P_2O_5$, and a support containing 30 wt % ultrastable Y-type crystalline aluminosilicate zeolite (Davison) dispersed in 70 wt % alumina. Catalyst 2 contained 5.0 wt % $Cr_2O_3$, 15.0 wt % $MoO_3$, 1.5 wt % CoO and 4.0 wt % oxygenated phosphorus component, calculated as $P_2O_5$, and a support containing 50 wt % ultrastable Y-type crystalline aluminosilicate zeolite (Davison) dispersed in 50 wt % alumina. In addition to runs with the catalysts of Examples 1 and 2 of Hensley et al., comparative runs were conducted using comparative catalysts A-C which were prepared according to the general procedure of Examples 1 and 2 but without the use of phosphoric acid in the case of A and B and without a zeolite component in the case of C. Compositions of catalysts A-C were as follows:

(A) 10.0 wt % $Cr_2O_3$, 15.0 wt % $MoO_3$ and 1.5 wt % CoO supported on a dispersion of 30 wt % ultrastable Y-type crystalline aluminosilicate zeolite (Davison) in 70 wt % alumina;

(B) 10.0 wt % $Cr_2O_3$, 15.0 wt % $MoO_3$ and 1.5 wt % CoO supported on a dispersion of 50 wt % ultrastable Y-type crystalline aluminosilicate zeolite dispersed in 50 wt % alumina;

(C) 5.0 wt % $Cr_2O_3$, 15.0 wt % $MoO_3$, 1.5 wt. % CoO and 4.6 wt % oxygenated phosphorus component, calculated as $P_2O_5$, supported on alumina.

We claim:

1. A process for denitrogenation of high nitrogen content hydrocarbon feeds comprising contacting the feed with hydrogen under denitrogenation conditions in the presence of a catalyst comprising an active metallic component comprising at least one metal having hydrogenation activity and at least one oxygenated phosphorus component, and a support component consisting essentially of at least one nonzeolitic, porous refractory inorganic oxide matrix component selected from the group consisting of alumina, silica, zirconia, titania, magnesia and combinations thereof and at least one crystalline molecular sieve zeolite component, wherein the high nitrogen content feed is a whole petroleum or synthetic crude oil, coal, shale or biomass liquid, or a fraction thereof containing at least about 0.4 wt % nitrogen.

2. The process of claim 1 wherein denitrogenation conditions are denitrogenation hydrotreating conditions and comprise a temperature of about 650° to about 760° F., hydrogen pressure of about 1000 to about 2500 psi, LHSV of about 0.2 to about 4 and hydrogen addition rate of about 2000 to about 20,000 SCFB.

3. The process of claim 1 wherein denitrogenation conditions are denitrogenation hydrocracking conditions and comprise a temperature of about 720° to about 820° F., hydrogen pressure of about 1000 to about 2500 psi, LHSV of about 0.2 to about 3 and hydrogen addition rate of about 4000 to about 20,000 SCFB.

4. The process of claim 1 wherein the hydrogenation metal of the active metallic component comprises at least one metal of Group VIB or VIII.

5. The process of claim 4 wherein the crystalline molecular sieve zeolite component comprises an ultrastable Y-type crystalline aluminosilicate zeolite, a crystalline borosilicate zeolite of the AMS-type or a crystalline aluminosilicate zeolite of the ZSM-type.

6. The process of claim 5 wherein the hydrogenating metal of the active metallic component comprises nickel-molybdenum, chromium-molybdenum-cobalt or chromium-molybdenum-nickel.

7. The process of claim 6 wherein the non-zeolitic, porous refractory inorganic oxide matrix component comprises alumina or silica-alumina.

8. The process of claim 6 wherein the support component comprises a dispersion of ultrastable Y-type crystalline aluminosilicate zeolite in alumina or silica-alumina.

9. The process of claim 8 wherein the active metallic component is deposed on the zeolite-alumina or/zeolite silica-alumina dispersion.

10. The process of claim 8 wherein the active metallic component is deposed on the alumina or silica-alumina component of the dispersion.

11. The process of any of claims 1–10 wherein the high nitrogen content feed comprises a whole shale oil or a shale oil fraction.

* * * * *

UNITED STATES PATENT OFFICE
CERTIFICATE OF CORRECTION

Patent No. 4,431,527     Dated February 14, 1984

Inventor(s) JEFFREY T. MILLER et al.

It is certified that error appears in the above-identified patent and that said Letters Patent are hereby corrected as shown below:

Column 1, line 40 "V1B" should read --VIB--

Column 3, line 2 "atmospheric pheric" should read --atmospheric distillates--

Column 6, line 45 "wherein" should read --therein--

Column 7, line 39 "coal, shale or" should read --coal, or--

Column 8, line 33 after "or" should delete -- / --

Column 7, line 33 "nonzeolitic" should read --non-zeolitic--

Column 7, after line 23, insert the followings:

UNITED STATES PATENT AND TRADEMARK OFFICE
CERTIFICATE OF CORRECTION

PATENT NO. : 4,431,527
DATED : February 14, 1984
INVENTOR(S) : Jeffrey T. Miller et al.

It is certified that error appears in the above-identified patent and that said Letters Patent is hereby corrected as shown below:

TABLE 1

| Run No. | 1 | 2 | 3 | 4 | 5 |
|---|---|---|---|---|---|
| Catalyst | 1 | A | 2 | B | C |
| Temp (°F) | 760 | 760 | 780 | 780 | 760 |
| Pressure (psi) | 1800 | 1800 | 1800 | 1800 | 1800 |
| LHSV (hour$^{-1}$) | 0.5 | 0.5 | 0.5 | 0.5 | 0.5 |
| Days on Oil | 6 | 9 | 7 | 6 | 6 |
| Liquid Product (g) | 184 | 239 | 124 | 190 | 198 |
| API Gravity (°) | 40.0 | 36.5 | 49.4 | 49.6 | 37.0 |
| Pour Point (°F) | 70 | 80 | -40 | -15 | 75 |
| Sulfur (ppm) | 2 | 110 | 6 | 262 | 57 |
| Nitrogen (ppm) | 1.7 | 173 | 0.7 | 3 | 85 |
| Simulated Distillation (%) | | | | | |
| IBP - 350°F | 14.5 | 10.7 | 44.5 | 42.0 | 9.0 |
| 350-650°F | 60.0 | 54.3 | 53.0 | 52.6 | 55.0 |
| 650°F+ | 25.5 | 35.0 | 2.5 | 5.4 | 36.0 |

UNITED STATES PATENT AND TRADEMARK OFFICE
CERTIFICATE OF CORRECTION

PATENT NO. : 4,431,527
DATED : February 14, 1984
INVENTOR(S) : Jeffrey T. Miller et al.

It is certified that error appears in the above-identified patent and that said Letters Patent is hereby corrected as shown below:

As can be seen from the table, use of catalysts 1 and 2 according to the invention resulted in superior denitrogenation as well as desulfurization activity as compared to all three comparative catalysts. Further, cracking activities of catalysts 1 and 2 were superior to those of the comparative catalysts as evidenced by simulated distillation data showing reduced 650°F+ content.

Signed and Sealed this

Twenty-sixth Day of February 1985

[SEAL]

Attest:

DONALD J. QUIGG

Attesting Officer

Acting Commissioner of Patents and Trademarks